J. E. MARRIOTT.
ARTIFICIAL TOOTH.
APPLICATION FILED NOV. 12, 1920.

1,380,819.

Patented June 7, 1921.

Witness
J. Milton Jester

Inventor
John E. Marriott
By D. R. Gowrick
Attorney

UNITED STATES PATENT OFFICE.

JOHN E. MARRIOTT, OF LATROBE, PENNSYLVANIA.

ARTIFICIAL TOOTH.

1,380,819. Specification of Letters Patent. Patented June 7, 1921.

Application filed November 12, 1920. Serial No. 423,697.

*To all whom it may concern:*

Be it known that I, JOHN E. MARRIOTT, a citizen of the United States, residing at Latrobe, in the county of Westmoreland and State of Pennsylvania, have invented new and useful Improvements in Artificial Teeth, of which the following is a specification.

This invention relates to dentistry, particularly to artificial teeth used in crown, bridge, and plate work, and has for its object the provision of a novel tooth construction including a porcelain body, a metallic backing therefor, and a peculiarly formed pin embedded within the porcelain body and which is for the purpose of holding the backing and also for holding the tooth associated with the vulcanite employed in certain phases of dental work.

A very important object is the provision of this securing pin which is formed triangular in shape and which is provided at its base with notches insuring its retention within the porcelain tooth body and within the vulcanite of a "plate" or the like.

An additional object is the provision of a tooth structure of this character which will be simple and inexpensive in manufacture, easy to assemble and attach, efficient and durable in use, and a general improvement in the art.

With the above and other objects and advantages in view, the invention consists in the details of construction to be hereinafter more fully described and claimed and illustrated in the accompanying drawings in which—

Figure 1:
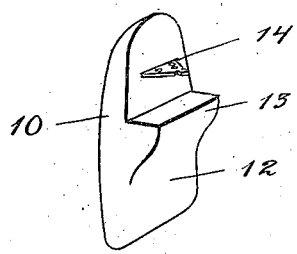
Figure 2:
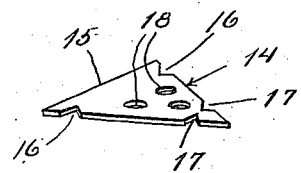
Figure 3:
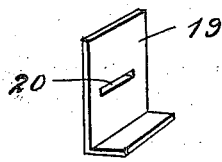
Figure 4:
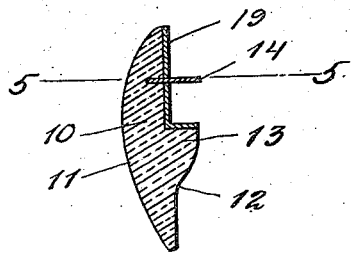
Figure 5:
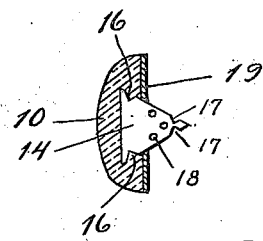

Figure 1 is a perspective view of the tooth body having my pin projecting therefrom, Fig. 2 is a perspective view of the so called pin detached, Fig 3 is a perspective view of the backing plate, Fig. 4 is a longitudinal sectional view through the assembled tooth, and Fig. 5 is a cross sectional view therethrough on the line 5—5 of Fig. 4.

Referring more particularly to the drawings, the numeral 10 designates the porcelain tooth body having the usual labial surface 11 and lingual surface 12 upon which is formed a projecting lip or extension 13 which defines a right angular shoulder, as clearly shown. The numeral 14 designates the so-called pin which is formed as a triangular piece of metal having its edges near its base portion 15 provided with notches 16 and having its apex portion formed at the edges with similar notches 17. This plate may also be formed with holes 18 if desired. The pin or plate 14 is baked into the porcelain tooth 10 between the lip 13 and the end opposite the incisal edge, the notches 16 insuring proper retention of the pin or plate within the tooth body.

Associated with the porcelain tooth body is a backing plate 19 shown very clearly in Fig. 3, which is formed of sheet metal bent into L-shape so as to lie conformingly against the rear face of the tooth and against the shoulder of the lip 13, and this backing plate is formed with a slot 20 for the passage of the pin 14.

In the assembling of the tooth, in actual practice, it is of course apparent that the pin 14 is baked into the porcelain tooth body. In applying the backing plate it is preferable to grind a slight bevel on the lingual side of the lip 13. The backing plate 19 is placed in position with the slot 20 passing over the projecting end of the pin. This backing plate is swaged and burnished firmly into place, specially over the lip 13 so as to insure complete investment of the porcelain. It is then necessary to heat the investment from the labial side of the tooth to a red heat so as first to expand the porcelain. The procedure is then the same as with any bridge work but it is important that all parts of the porcelain near the lingual edge, not covered by gold, are covered by investment material.

In the case of ordinary crown and bridge work the end of the pin or plate 14 which projects beyond the backing plate is sheared off while in vulcanite work this projecting end of the pin is allowed to remain as it provides means for securing the tooth to the vulcanite, the notches 17 and holes 18 insuring retention.

From the foregoing description and a study of the drawings it will be apparent that I have thus provided a simply constructed porcelain body tooth which will be highly efficient and durable, and which is equally well adapted for use in crown or bridge work and in vulcanite work.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

A tooth of the character described comprising a porcelain body, a triangular shaped securing pin projecting from the lingual surface of the body with its base embedded within the body, and a backing plate disposed against the lingual surface of the body and formed with a slot for the accommodation of said pin, the side edges of the pin near the base portion being formed with notches insuring retention of the pin within the body, the pin projecting beyond the backing plate and being adapted to be embedded within vulcanite used in "plate" work, the portion of the pin projecting beyond the backing plate being formed in its edges with notches.

In testimony whereof I hereto affix my signature.

JOHN E. MARRIOTT.